United States Patent
Van Kaathoven et al.

(10) Patent No.: US 10,036,533 B2
(45) Date of Patent: Jul. 31, 2018

(54) COLLIMATOR WITH IMPROVED LIGHT MIXING AND COLOUR MIXING PROPERTIES

(71) Applicant: PHILIPS LIGHTING HOLDING B.V., Eindhoven (NL)

(72) Inventors: Dirk Jan Van Kaathoven, Eindhoven (NL); Denis Joseph Carel Van Oers, Bocholt (BE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 21 days.

(21) Appl. No.: 15/031,256

(22) PCT Filed: Oct. 10, 2014

(86) PCT No.: PCT/EP2014/071768
§ 371 (c)(1),
(2) Date: Apr. 21, 2016

(87) PCT Pub. No.: WO2015/062847
PCT Pub. Date: May 7, 2015

(65) Prior Publication Data
US 2016/0258594 A1    Sep. 8, 2016

(30) Foreign Application Priority Data

Nov. 4, 2013 (EP) ..................... 13191334

(51) Int. Cl.
*F21V 8/00*    (2006.01)
*F21V 7/00*    (2006.01)
(Continued)

(52) U.S. Cl.
CPC .............. *F21V 7/0091* (2013.01); *F21K 9/62* (2016.08); *F21V 5/00* (2013.01); *F21V 13/04* (2013.01);
(Continued)

(58) Field of Classification Search
CPC ........ F21V 7/0091; F21V 13/04; F21V 5/002; F21K 9/62; G02B 19/0028;
(Continued)

(56) References Cited

U.S. PATENT DOCUMENTS 8,979,337 B2 * 3/2015 Creusen .................... F21K 9/00
362/265
9,348,160 B2 * 5/2016 Hsu ........................ G02F 1/1323
9,360,185 B2 * 6/2016 Demuynck ............. F21V 13/04

FOREIGN PATENT DOCUMENTS

WO    2006033032 A1    3/2006
WO    2013029400 A1    3/2013

* cited by examiner

*Primary Examiner* — Karl D Frech
(74) *Attorney, Agent, or Firm* — Akarsh P. Belagodu

(57) ABSTRACT

This invention relates to collimator (100) for a light source (108), the collimator (100) comprising: a body (106), a cavity (110) formed on a bottom side (120) of the body (106) for housing the light source (108), the cavity (110) having an entrance surface (112, 114) arranged for receiving light generated by the light source (108), a total internal reflection, TIR, surface (124) provided at a side surface (104) of the body (106), an exit surface (102) provided at a top side (122) of the body (106) and arranged for emission of collimated light, wherein the entrance surface (112, 114) comprises surface roughness having a roughness value, such that improved light mixing of light from the light source (108) entering the collimator (100) is achieved.

7 Claims, 3 Drawing Sheets

(51) Int. Cl.
*G02B 19/00* (2006.01)
*F21V 13/04* (2006.01)
*F21K 9/62* (2016.01)
*F21V 5/00* (2018.01)
*F21Y 115/10* (2016.01)
*F21Y 101/00* (2016.01)

(52) U.S. Cl.
CPC ..... *G02B 19/0028* (2013.01); *G02B 19/0061* (2013.01); *G02B 19/0066* (2013.01); *F21V 5/002* (2013.01); *F21Y 2101/00* (2013.01); *F21Y 2115/10* (2016.08)

(58) Field of Classification Search
CPC ............ G02B 19/0061; G02B 19/0066; F21Y 2115/10; F21Y 2101/00
USPC ....... 362/310, 265, 237, 240, 241, 244, 245, 362/246
See application file for complete search history.

COLLIMATOR WITH IMPROVED LIGHT MIXING AND COLOUR MIXING PROPERTIES

CROSS-REFERENCE TO PRIOR APPLICATIONS

This application is the U.S. National Phase application under 35 U.S.C. §371 of International Application No. PCT/EP2014/071768, filed on Oct. 10, 2014, which claims the benefit of European Patent Application No. 13191334.5, filed on Nov. 4, 2013. These applications are hereby incorporated by reference herein.

FIELD OF THE INVENTION

This invention relates to a collimator for a light source, in particular to a collimator having an entrance surface arranged for receiving light from the light source. This invention further relates to a method for forming such a collimator.

BACKGROUND OF THE INVENTION

A collimator is a device which changes the direction of light received by the collimator such that light emitted from the collimator is aligned in a specific direction. Consequently, light with a certain angular range entering the collimator may be emitted with a narrower angular range, i.e. emitted light is collimated (paralleled). The collimator may comprise a total inner reflection (TIR) surface such that the light losses in the collimator are largely avoided.

A problem with collimators may be that the colour and light mixing properties of the collimator is not sufficient such that light emitted from the collimator for example may contain darker areas and lighter areas or the colour homogeneity of emitted light may be unsatisfactory. One solution to this problem may be to include facets on the TIR surface or lenticular lens arrays on the light exit surface of the collimator.

WO 2006/033032 A1 (Koninklijke Philips Electronics N.V.) discloses a combination of a facetted light collimator and a facetted light reflector. The facetted light collimator comprises facets in different levels. The document further discloses a light-shaping diffuser positioned such that emitted light from the facetted light collimator is diffused by the diffuser.

WO 2013/029400 (Huizhou light engine LTD) relates to a lens applied to semiconductor solid-state lighting comprises a lens body; a total reflection surface disposed on an outer side of the lens body, the shape of the total reflection surface being a scaly polyhedron; a recess, formed in a middle position below the lens body, and used for accommodating an LED, the recess having a side surface and a top portion, and the side surface of the recess being in the shape of a cylindrical surface, a tapered surface or a revolution surface; a micro-lens array formed at the top portion of the recess; and an exit surface disposed at the top portion of the lens body, the exit surface comprising one or more flat or curved surfaces.

However, further improvements of the light mixing and colour mixing properties of a collimator are desired.

SUMMARY OF THE INVENTION

In view of the above, an object of the invention is to provide a collimator for a light source having advantageous light mixing and colour mixing properties.

According to a first aspect of the invention, this and other objects are achieved by a collimator comprising: a body, a cavity formed on a bottom side of the body for housing the light source, the cavity having an entrance surface arranged for receiving light generated by the light source, a total internal reflection (TIR) surface provided at a side surface of the body, an exit surface provided at a top side of the body and arranged for emission of collimated light, wherein the entrance surface comprises surface roughness having a roughness value, such that improved light mixing and/or colour mixing of light from the light source entering the collimator is achieved.

The present invention is based on the idea of providing a collimator where light that is collimated is diffused, i.e. scattered and refracted, already when entering the collimator. This inventive mixing property of the collimator is achieved by a surface roughness on the entrance surface of the collimator. The surface roughness scatters and refracts light that enters the collimator such that an improved light mixing may be achieved. Surprisingly the efficiency loss may be small since most of the scattered light still may fulfil the requirements for being reflected by the TIR surface provided at the side surface of the body of the collimator.

By the term "light mixing and or colour mixing" should, in the context of present specification, be understood as both colour mixing of light emitted from the collimator in the case the light source emits multi coloured light and light mixing in the sense of providing a smooth luminance profile for light emitted from the collimator. In other words, the collimator of the present invention may emit light with a constant colour over the beam profile as well as a smooth luminance profile.

The term "light source" should be understood to refer to any one or more of a variety of radiation sources, including, but not limited to, LED-based sources, incandescent sources (e.g., filament lamps, halogen lamps), fluorescent sources, phosphorescent sources, high-intensity discharge sources (e.g., sodium vapour, mercury vapour, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "surface roughness" should be understood to refer to the texture of a surface. The "surface roughness value" is thus a measure of the surface roughness quantified by the vertical deviations of a real surface from its ideal form. If the deviations are large, the surface is rough, i.e. a high surface roughness value; if the deviations are small the surface is smooth, i.e. a low surface roughness value.

According to one embodiment, the entrance surface may comprise at least a first and a second entrance surface, wherein the surface roughness value of the surface roughness of the first entrance surface differs from the surface roughness value of the surface roughness of the second entrance surface. An advantage of this embodiment may be that the light mixing and colour mixing properties of the collimator is increased since the surface roughness can be chosen independently of each other. The surface roughness of an entrance surface may for example be chosen based on the angular range, colour and/or intensity of light entering the collimator through the entrance surface. It may further be chosen based on if light entering the collimator through the entrance surface will be further mixed inside the collimator or not.

According to one embodiment, the roughness value of the surface roughness of the first entrance surface is higher compared to the roughness value of the surface roughness of the second entrance surface. This may be advantageously since, according to some embodiments, light entering the collimator through the first entering is not reflected by the TIR surface before being emitted from the collimator through the exit surface. Consequently, light entering the collimator through the first entrance surface may no be further mixed inside the collimator. Thus, a higher roughness value of the surface roughness of the first entrance surface may be desired. Moreover, since light entering the collimator through the first entrance surface according to this embodiment will not hit the TIR surface, light leakage through the TIR surface is not an issue for this light. Consequently, no such considerations are required when designing the surface roughness of the first entrance surface. On the contrary, light entering the collimator through the second entrance surface may be further mixed by the TIR surface before being emitted through the exit surface of the collimator. Consequently, lower roughness value of the surface roughness of the second entrance surface may be acceptable.

The roughness value may be expressed in terms of VDI (Verein Deutscher Ingenieure, the Society of German Engineers) and the surface roughness value of the surface roughness of the first entrance surface may have a roughness value within the range of 1-32, and the surface roughness value of the surface roughness of the second entrance surface may have a roughness value within the range of 1-26. According to some embodiments, the surface roughness value of the surface roughness of the first entrance surface may have a roughness value within the range of 22-32, and the surface roughness value of the surface roughness of the second entrance surface may have a roughness value within the range of 16-26. This may improve the light mixing and/or colour mixing properties of the collimator while reducing any light leakage from the TIR surface. A lower VDI value will mix the light less than a higher VDI value. However, a low VDI value, such as 1, will still mix the light and may be advantageously in some circumstances.

According to a further embodiment, the first entrance surface is perpendicular to an optical axis of the light source, and/or the second entrance surface is substantially parallel to the optical axis. Since the cavity may be formed using injection moulding, a draft angle of the second entrance surface may be required for easier removal of the mould. Normally these draft angles are around 1.5°-4° to also accommodate for the surface roughness. This exemplary design of the cavity may be advantageous when designing the surface roughness of the first and second entrance surfaces. This exemplary design of the cavity may further simplify the manufacturing process of the collimator. The cavity, formed on the bottom side of the body for housing the light source, may for example have a cubical shape or a cylindrical shape.

According to some embodiments, a material of the collimator is polycarbonate, PC, and/or polymethylmethacrylate, PMMA. Depending on the application, either PC or PMMA may be advantageous since they have different refractive index. A combination of the two materials is equally possible.

According to another embodiment, the light source comprises a solid state light source such as for example light-emitting diodes (LEDs), organic light-emitting diodes (OLEDs), or polymer light-emitting diodes (PLEDs). An advantage with solid state light sources may be that a reduced heat generation is achieved. A further advantage may be that a solid state light source provides for greater resistance to shock and vibration compared to brittle glass tubes/bulbs.

According to an embodiment, the light source comprises a plurality of light emitters. The light emitters may in that case be spatially separated. This may for example be advantageously when a multi-coloured light source is required, for example a colour tuneable directional spot. The spatially separated light emitters may provide an improved flux level of the light source.

According to a second aspect, the present invention provides a luminaire comprising a light source and a collimator according to first aspect of the present invention.

According to a third aspect, the present invention provides a method for forming a collimator for a light source, comprising the steps of: providing a mould, the mould comprising a protrusion for forming a cavity on a bottom side of a body of the collimator for housing the light source, subjecting a surface of the protrusion with a surface roughness treatment, and forming the collimator by injection moulding using the mould.

According to an embodiment, the surface roughness treatment comprises one of chemical etching, electrical discharge etching and sandblasting. These methods of forming the surface roughness may provide a variety of surface roughness values. They may further provide surface roughness with a high roughness value.

According to a further embodiment, the step of forming the collimator further comprises injecting a material into the mould, wherein the material is polycarbonate, PC, and/or polymethylmethacrylate, PMMA.

The second and third aspect may generally have the same features and advantages as the first aspect.

It is noted that the invention relates to all possible combinations of features recited in the claims. Generally, all terms used in the claims are to be interpreted according to their ordinary meaning in the technical field unless explicitly defined otherwise herein.

Other objectives, features and advantages of the present invention will appear from the following detailed disclosure as well as from the drawings.

BRIEF DESCRIPTION OF THE DRAWINGS

This and other aspects of the present invention will now be described in more detail, with reference to the appended drawings showing embodiments of the invention, wherein.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
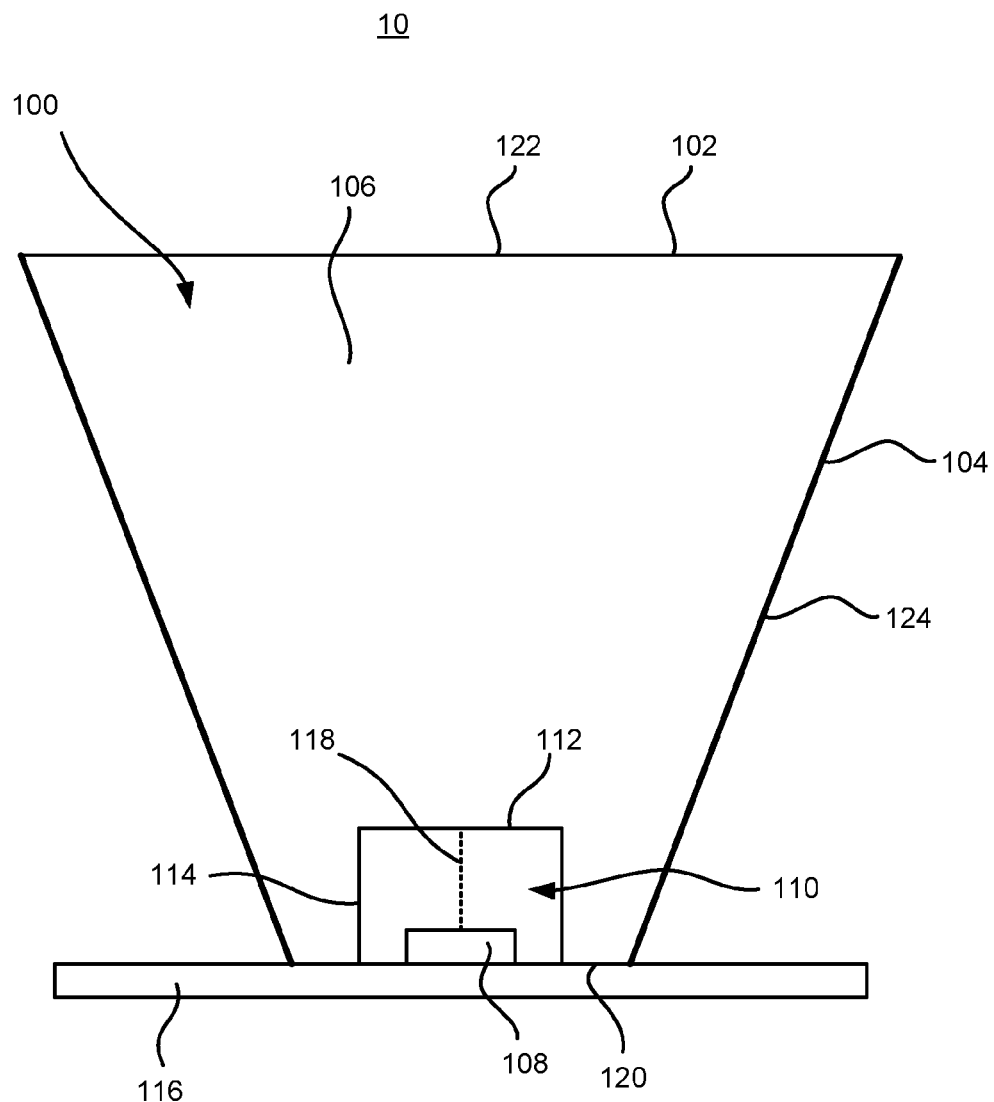
FIG. 1 schematically illustrates a vertical cross section luminaire comprising a collimator according to the first aspect of the invention.

FIG. 1 show the structure of embodiments of the present invention in cross section. The shown arrangement 10, e.g. a luminaire such as a spot, comprises a collimator 100 for a light source 108. The collimator 100 and the light source 108 are mounted on a mounting housing 116, for example a printed circuit board. The collimator 100 comprises a body 106.

The body 106 of the collimator 100 may comprise polycarbonate (PC) with a refractive index of 1.58. Other applicable materials are likewise feasible, such as polymethylmethacrylate (PMMA) having a refractive index of 1.49, or a combination of PC and PMMA. With a refractive index of the collimator 100 higher than the medium surrounding it, preferably air with a refractive index of 1.0, a side surface 104 of the body 106 of the collimator 100 consequently provides a surface 124 with the commonly known optical phenomenon total internal reflection (TIR) for light received from the light source 108.

The collimator further comprises an exit surface 102 provided at a top side 122 of the body 106 and arranged for emission of collimated light.

The collimator 100 further comprises a cavity 110 formed on a bottom side 120 of the body 106 for housing the light source 108. The cavity 110 has an entrance surface 112, 114 arranged for receiving light generated by the light source 108. The entrance surface 112, 114 comprises surface roughness having a roughness value, such that improved light mixing of light from the light source 108 entering the collimator 100 is achieved. The surface roughness will be explained in detail in conjunction with FIG. 2 below.

According to this exemplary embodiment, the entrance surface 112, 114 in the cavity 110 comprises two different entrance surfaces. A first entrance surface 112 is perpendicular to an optical axis 118 of the light source 108. A second entrance surface 114 is substantially parallel to the optical axis 118 of the light source. As explained above, a draft angle of the second entrance surface may be required for facilitate injection moulding of the cavity. The 3D shape of the cavity may according to this embodiment be a cylinder or a cubical. In the case of the cubical shape, the second entrance surface 114 comprises the four side surfaces of the cubic and the first entrance surface 112 comprises the top surface of the cubic. In the case of a cylindrical shape, the second entrance surface 114 comprises the circumferential side surface of the cylinder, and the first entrance surface 112 comprises the top surface of the cylinder. Other designs of the entrance surface are equally possible. For example, the entrance surface may comprise only one, dome shaped, entrance surface. Or the entrance surface may comprise three different entrance surfaces which together shape a triangle above the light source. According to further embodiment, the entrance surface comprises more than two different entrance surfaces, shaped such that improved light mixing of light entering the collimator is achieved.

The light source 108 may be any suitable light source. According to one embodiment, the light source 108 is a solid state light source such as a LED light source. It may be noted that even if the light source 108 in FIG. 1 is presented as one light source, this is only for illustration purposes and should not be construed as limiting for the scope of the invention. The light source 108 may comprise a plurality of light emitters. The plurality of light emitters may be spatially separated, i.e. they may not be positioned in abutment with each other. In one embodiment, each of the light emitters emits light with the same colour. In this case, the colour mixing properties of the collimator is not an issue, but the luminance profile of the collimator may be an issue, especially in the case of a plurality of spatially separated light emitters. An observer of the luminaire 10 should advantageously not perceive emitted light as emitted by a plurality of light emitters. The collimator 100 according to the invention may provide an improved light mixing, i.e. light emitted from the exit surface 102 of the collimator 100 may be emitted with a more even luminance profile compared to a collimator with no surface roughness on the entrance surface of the collimator. In another embodiment, the plurality of light emitters comprises at least a first light emitter emitting light with a first colour and at least a second light emitter emitting light with a second colour. In this case, colour mixing may be an issue. An observer of the luminaire 10 should advantageously not perceive emitted light as emitted by a plurality of light emitters and should not perceive light emitted from the light source as having different colours. The collimator 100 according to the invention may provide an improved colour mixing, i.e. light emitted from the exit surface 102 of the collimator 100 may be perceived as being emitted by a single colour light source instead of a plurality of different coloured light sources.

The cavity 110 may be positioned substantially in the center of the bottom side 120 of the body 106. The light source 108 may be positioned on the mounting housing 116 substantially in the center of the cavity 110. This symmetrical arrangement may simplify the production process of the surface roughness of the entrance surfaces 112 114 and further improve the light mixing properties of the collimator 100.

Figure 2:
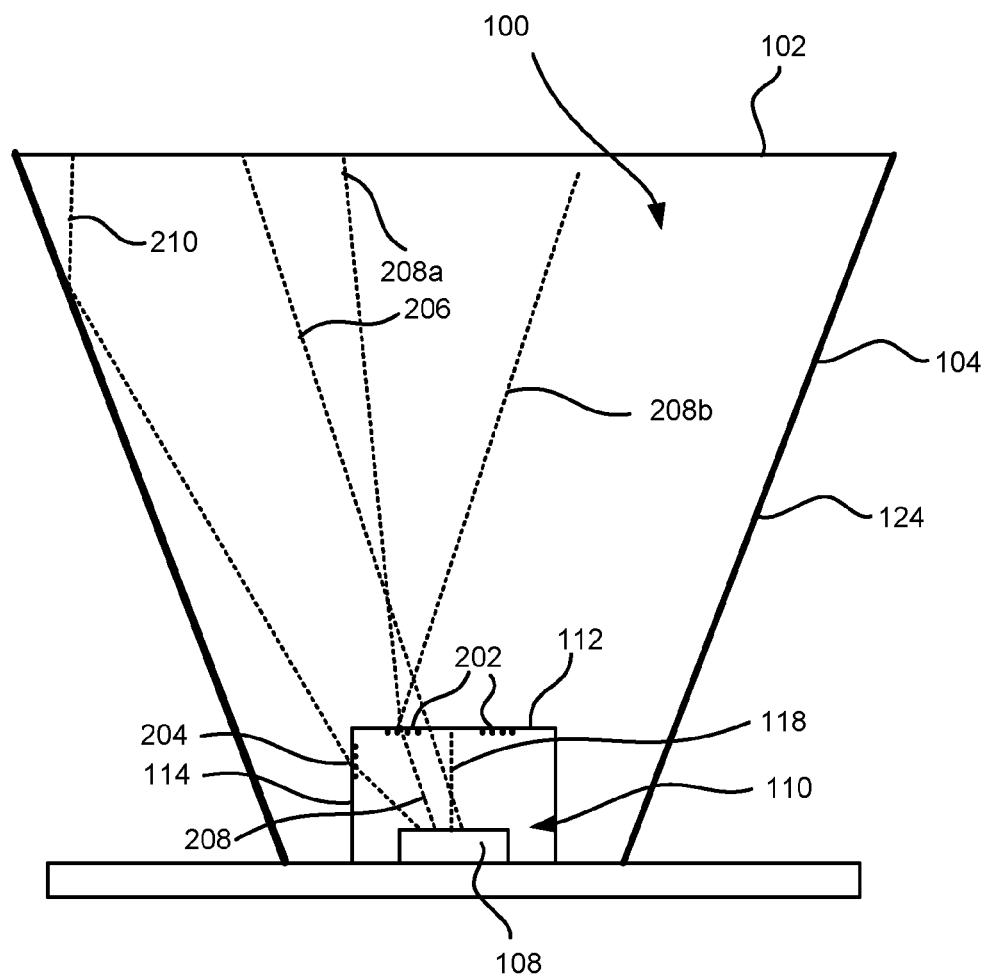
FIG. 2 illustrates light mixing properties of the collimator of FIG. 1.

FIG. 2 illustrates further details of the light mixing properties of the inventive collimator 100. The collimator 100 comprises the first 112 and the second 114 entrance surface. Each of the entrance surfaces 112, 114 comprises portions of surface roughness 202, 204. It may be noted that according to some embodiments, the entire first entrance surface 112 and/or the second entrance surface 114 comprises surface roughness. The surface roughness value of the surface roughness 202 of the first entrance surface 112 may differ from the surface roughness value of the surface roughness 204 of the second entrance surface 114. If the surface roughness values of the surface roughness 202, 204 are chosen independently of each other, the light mixing and/or colour mixing properties may be improved.

The first entrance surface 112 may be arranged to receive light generated by the light source 108 at angles closer to the optical axis 118 of the light source 108 compared to light received by the second entrance surface 114.

The light mixing properties of the collimator 100 will now be explained. Light emitted by the light source 108 enters the collimator 100 through the entrance surfaces 112, 114. In the case light enters through portions of the entrance surfaces 112, 114 which comprises surface roughness, light may be refracted differently than light entering the collimator through a portion of the surface which does not comprise surface roughness. Light entering the collimator through a surface roughness may further be scattered. In that case, each resulting light beam may be refracted in a different direction.

In FIG. 2, the first entrance surface 112 comprises two portions of surface roughness 202. The second entrance surface 114 comprises a portion of surface roughness 204.

The surface roughness portions 202 on the first entrance surface may have a surface roughness value that is larger than the surface roughness value of the surface roughness portion 204 on the second entrance surface 114. In terms of VDI (Verein Deutscher Ingenieure, the Society of German Engineers), which is a scale for surface finishes, the surface roughness value of the surface roughness portions 202 may be 27. The surface roughness portions 204 may have a VDI value of 22. This is only an example of possible roughness values. The roughness value of the surface roughness 202 of the first entrance surface 112 may have a VDI value within the range of 22-32 and the roughness value of the surface roughness 204 of the second entrance surface 114 may have a VDI value within the range of 18-26. The surface roughness value may be expressed in other terms such as Ra or Rz.

As seen in FIG. 2, a light beam 206 is emitted from the light source 108 and enters the collimator 100 through a portion of the first entrance surface 112 which does not comprise surface roughness. The light beam 206 is thus not scattered when entering the collimator 100. The light beam may be refracted due to the difference between the refractive index of the medium of the cavity and the refractive index of the material of entrance surface 112 of the collimator 100, but the light beam 206 is not further refracted due to any surface roughness. Further, a light beam 208 is emitted from the light source 108 and enters the collimator 100 through one of the portions 202 of the first entrance surface 112 which does comprise surface roughness. The light beam 208 is thus refracted and scattered into two light beams 208a, 208b. As described above, since light entering the collimator 100 through the first entrance surface 112 does not hit the TIR surface 124 it may be important that this light get more mixed compared to light entering the collimator 100 through the second entrance surface 114 which is reflected by the TIR surface 124. Consequently it may be important that the roughness value of the surface roughness 202 of the first surface 112 is higher compared to the roughness value of the surface roughness 204 of the second surface 114

Further, a light beam 210 is emitted from the light source 108 and enters the collimator 100 through the portion 204 of the second entrance surface 114 which does comprise surface roughness. The light beam 210 is thus refracted and possibly scattered (not shown). The light beam 210 is then reflected by the TIR surface 124 before being emitted from the exit surface 102 of the collimator 100.

Because the TIR surface 124 still functions for most of the refracted and scattered light entering the collimator 100, the increase in beam angle, i.e. light emitted from the collimator 100, which is caused by the larger "virtual" light source because of the surface roughness 202, 204 of the entrance surfaces 112, 114, may be limited. The lower the roughness value of the surface roughness 204 of the second surface 114 is, the less light will leak out of the TIR surface 124. On the other hand, the higher the roughness value of the surface roughness 204 of the second surface 114 is, the more will the mixing properties of the collimator 100 be improved.

Figure 3:
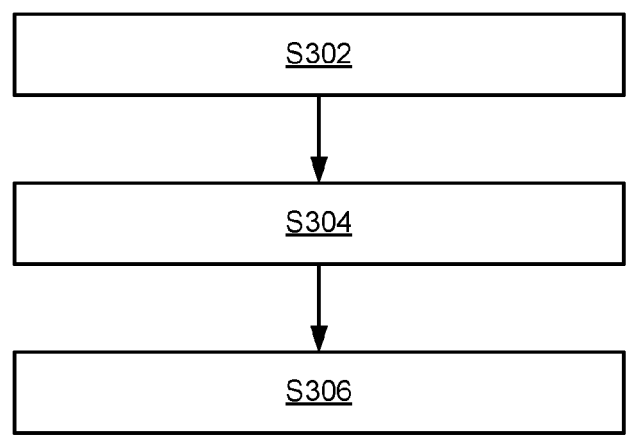
FIG. 3 illustrates a method for forming the collimator of FIGS. 1 and 2.

FIG. 3 illustrates a method 300 for forming the collimator for a light source, for example the collimator shown in FIGS. 1-2. The method comprises providing S302 a mould. The mould comprises a protrusion for forming a cavity on a bottom side of a body of the collimator for housing the light source.

The method further comprises subjecting S304 a surface of the protrusion with a surface roughness treatment. According to embodiments, the surface roughness treatment comprises one of chemical etching, electrical discharge etching and sandblasting. Further suitable surface roughness treatments are equally possible.

The method further comprises forming S306 the collimator by injection moulding using the mould. The injection moulding may comprise injecting polycarbonate, PC, and/or polymethylmethacrylate, PMMA into the mould.

The person skilled in the art realizes that the present invention by no means is limited to the preferred embodiments described above. On the contrary, many modifications and variations are possible within the scope of the appended claims. For example, the collimator 100 may comprise further light mixing features, for example facets on the TIR surface 124 and/or a lenticular lens array on the exit surface 102 of the collimator 100. In this case, light entering the collimator 100 through the first entrance surface 112 may be arranged to not be mixed by the lenticular lens array on the exit surface 102 of the collimator 100. Since light entering the collimator 100 through the first entrance surface 112 may be arranged to not be reflected by the TIR surface 124, as described above, such light will not be mixed by any facets on the TIR surface 124. On the contrary, light entering the collimator 100 through the second entrance surface 114 may be arranged to be mixed by the lenticular lens array on the exit surface 102 of the collimator 100. Consequently, light entering the collimator 100 through the second entrance surface 114 may get further mixed inside the collimator 100, by the facets on the TIR surface 124 and/or by the lenticular lens array on the exit surface 102 and thus reducing the need for a high roughness value of the surface roughness 204 of the second entrance surface 114. This in turn may reduce the leakage of light through the TIR surface 124 as described above.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A collimator for a light source, the collimator comprising:
   a body,
   a cavity formed on a bottom side of the body for housing the light source, the cavity having an entrance surface arranged for receiving light generated by the light source,
   a total internal reflection, TIR, surface provided at a side surface of the body,
   an exit surface provided at a top side of the body and arranged for emission of collimated light,
   wherein the entrance surface comprises surface roughness having a roughness value,
   wherein the roughness value is expressed in an average roughness height in micrometers,
   wherein the entrance surface comprising at least a first and a second entrance surface,
   wherein the roughness value of the surface roughness of the first entrance surface is higher compared to the roughness value of the surface roughness of the second entrance surface
   characterized in that
   the surface roughness value of the surface roughness of the first entrance surface has a roughness value within a range of 1.26-4 micrometer, and the surface roughness value of the surface roughness of the second entrance surface has a roughness value within a range of 0.63-2 micrometer, the first entrance surface is perpendicular to an optical axis of the light source and the second entrance surface deviate from the optical axis by a draft angle of 1.5°-4°.

2. The collimator according to claim 1, wherein the cavity having a shape of one of a cubical shape and a cylindrical shape.

3. The collimator according to claim 1, wherein a material of the collimator is polycarbonate, PC, and/or polymethylmethacrylate, PMMA.

4. The collimator according to claim 1, wherein the light source comprises a solid state light source.

5. The collimator according to claim 1, wherein the light source comprises a plurality of light emitters.

6. The collimator according to claim 5, wherein each of the plurality of light emitters are spatially separated.

7. A luminaire comprising a light source and a collimator according to claim 1.

\* \* \* \* \*